United States Patent [19]

Kamata et al.

[11] 4,069,472
[45] Jan. 17, 1978

[54] FOREGROUND SUBJECT-IDENTIFYING APPARATUS

[75] Inventors: Shohichi Kamata; Yoshinori Kimura, both of Yokohama; Johji Sakuragi, Hachioji, all of Japan

[73] Assignee: Tokyo Shibaura Electric Co., Ltd., Kawasaki, Japan

[21] Appl. No.: 753,530

[22] Filed: Dec. 22, 1976

[30] Foreign Application Priority Data

Dec. 25, 1975 Japan .................................. 50-156931
Dec. 25, 1975 Japan .................................. 50-156932
Aug. 3, 1976 Japan .................................. 51-92456

[51] Int. Cl.$^2$ .................................................. G01S 9/56
[52] U.S. Cl. .......................... 340/146.3 K; 343/6.5 SS
[58] Field of Search ................ 340/146.3 K, 258 R; 343/6.5 R, 6.5 LC, 6.5 SS, 6.8 R, 7 ED, 225

[56] References Cited

U.S. PATENT DOCUMENTS

| | | | |
|---|---|---|---|
| 3,072,899 | 1/1963 | Kleist et al. | 343/6.5 SS |
| 3,169,242 | 2/1965 | Davis et al. | 343/6.5 SS |
| 3,172,102 | 3/1965 | Chapman | 343/6.5 SS |
| 3,384,892 | 5/1968 | Postman | 343/6.5 R |
| 3,427,613 | 2/1969 | Kawahara et al. | 343/6.5 SS |
| 3,737,911 | 6/1973 | Sakuragi et al. | 343/6.5 SS |
| 3,798,642 | 3/1974 | Augenblick et al. | 343/6.5 SS |

*Primary Examiner*—Leo H. Boudreau
*Attorney, Agent, or Firm*—Oblon, Fisher, Spivak, McClelland & Maier

[57] ABSTRACT

A foreground subject-identifying apparatus comprises a sweep signal generator for issuing a sweep signal having frequencies $f_s$ falling within a prescribed range; a carrier wave generator for producing a carrier wave having a frequency $f_0$; a first frequency mixer for mixing output signals from the sweep signal generator and carrier wave generator to generate an output signal having a frequency $f_0 \pm f_s$; a first antenna through which to transmit an output signal from the first frequency mixer; a second antenna mounted on the foreground subject to receive an output signal sent forth from the first antenna; a coding circuit carried on the foreground subject which is provided with a plurality of resonance circuits resonating at different frequencies $f_T$ and adapted to form a specified code from a combination of these different resonance frequencies; a signal mixer for detecting an output signal from the second antenna to supply a signal having frequencies $f_s$ to the coding circuit and modulating the signal having a frequency $f_0$ by resonance signals from the coding circuit to deliver a signal having a frequency $f_0 \pm f_T$ to the second antenna; a second frequency mixer for mixing an output signal having a frequency $f_0$ from the carrier wave generator, and a signal having a frequency $f_0 \pm f_T$ received from the signal mixer through the second and first antennas and thereby issuing a signal having a frequency $f_T$; and a coded signal interpreting circuit for detecting resonance frequencies out of a signal delivered from the second frequency mixer, thereby interpreting a coded signal supplied from the coding circuit.

13 Claims, 11 Drawing Figures

FOREGROUND SUBJECT-IDENTIFYING APPARATUS

This invention relates to a foreground subject-identifying apparatus.

Recent development of traffic means has enabled a large amount of freight to be transported quickly through railways or high speed roads. As the result, demand is made for development of a reliable traffic control system to effect safe and rapid freight transportation.

A foreground subject-identifying apparatus proposed to date utilizes an electromagnetic induction system to identify, for example, a specified freight car or train. However, this proposed foreground subject-identifying apparatus utilizing electromagnetic induction coupling has the drawback that a electromagnetic induction coupling element of a responding device can not be fitted near an iron member used with a specified freight car or train being identified. Further, an interrogator device lying between rails has to be so positioned as to approach the responding device at a smaller distance than scores of centimeters in order to establish effective electromagnetic induction coupling with the responding device. Therefore, freight transportion, for example, in containers by truck or trailer makes it impossible to apply the above-mentioned foreground subject-identifying apparatus, extremely restricting the range in which the proposed apparatus can be applied.

It is accordingly the object of this invention to provide a foregroung subject-identifying apparatus admitting of wide application.

According to an aspect of this invention, there is provided a foreground subject-identifying apparatus which comprises first signal-generating means for producing a first signal having a plurality of frequencies falling within a prescribed range; second signal-generating means for issuing a second signal; first frequency-mixing means for mixing output signals from the first and second signal-generating means; first transmission and reception means for sending forth an output signal from the first frequency-mixing means; second transmission and reception means for receiving an output signal from the first transmission and reception means; coding means provided with at least one resonance circuit and adapted to issue a coded signal corresponding to the resonance frequency of the resonance circuit; a nonlinear circuit connected between the second transmission and reception means and coding means and adapted to detect an output signal from the second transmission and reception means to supply a signal corresponding to the first signal to the coding means, and modulate a signal corresponding to the second signal by a coded signal delivered from the coding means to conduct the modulated signal to the second transmission and reception means; frequency mixing means for mixing signals sent forth from the second signal-generating means and second transmission and reception means and received through the first transmission and reception means and producing a signal corresponding to the coded signal; and a coded signal-interpreting circuit for judging the coded signal from an output signal supplied from the second frequency-mixing means, and wherein the first signal generating means, second signal generating means, first frequency-mixing means for a transmission and reception means, second frequency-mixing means and coded signal-generating circuit collectively constitute an interrogator device; and the second transmission and reception means, nonlinear circuit and coding means jointly form a responding device fitted to the foreground subject.

This invention can be more fully understood from the following detailed description when taken in conjunction with the accompanying drawings, in which.

Figure 1:
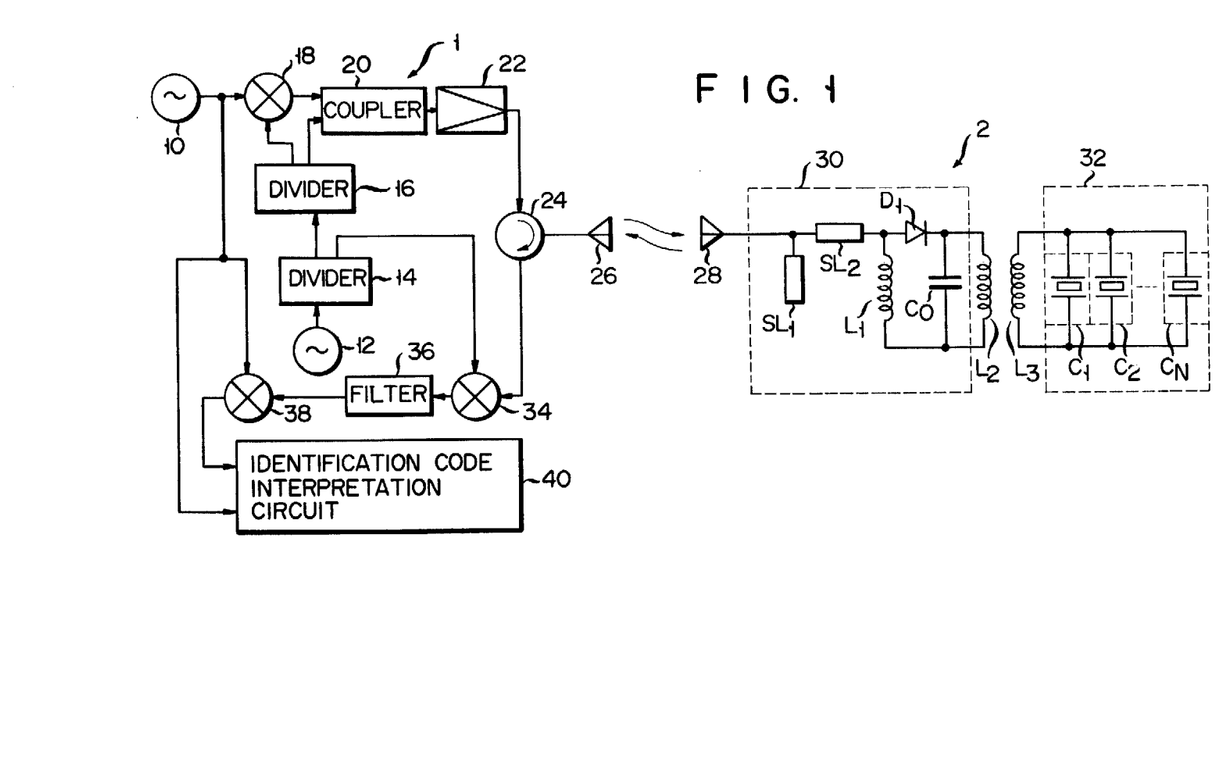
FIG. 1 is a schematic block circuit diagram of a foreground subject-identifying apparatus according to an embodiment of this invention.

The foreground subject-identifying apparatus of FIG. 1 according to one embodiment of this invention has an interrogating device 1 generally fixed on the ground to issue question signals, and a responding device 2 carried on, for example, a freight train to give answer signals having specified codes upon receipt of question signals sent forth from the interrogating device 1. The interrogating device 1 is operated upon receipt of an output signal from the responding device 2 and interprets the specific code of an answer signal.

The interrogating device 1 includes a sweep signal generator 10 for issuing a sweep signal whose frequency $f_s$ repeatedly varies, for example, from 269 to 532 kHz every 30 milliseconds, and a carrier wave generator 12 for sending forth a carrier wave having a frequency $f_0$ of, for example, 10.5 GHz. An output signal from the carrier wave generator 12 is divided into two portions by a divider 14 formed of, for example, a 3-decibel hybrid circuit or directional coupler. One output signal from the divider 14 is further divided into two portions by another divider 16. One of the two divided portions of the divider 16 is supplied to a frequency mixer 18 and the other to a coupler 20. The frequency mixer 18 mixes a carrier wave and a sweep signal supplied from the sweep signal generator 10 to modulate the carrier wave by the sweep signal, and sends forth to the coupler 20 a modulated signal whose frequency is represented by $f_0 \pm f_s$. Thus, the coupler 20 generates a composite signal formed of the signal having the frequency $f_0 \pm f_s$ and the signal having the frequency $f_0$. The composite signal is amplified to a prescribed power level by an amplifier 22 formed of, for example, a 1 to 40 GHz travelling wave tube type amplifier, Gunn diode type reflective amplifier or injection type synchronous amplifier provided with an IMPATT diode. The composite signal thus amplified is transmitted as a question signal from an antenna 26 to a responding device 32 through a circulator 24. The antenna 26 is formed of, for example, a horn antenna, slot antenna, or parabolic antenna.

The responding device mounted on a foreground subject receives a composite question signal emitted from the antenna 26 which is formed of a signal having the frequency $f_0 \pm f_s$ and a signal having the frequency $f_0$, through an antenna 28 formed of, for example, a waveguide or plain slot antenna. A signal thus received is conducted to the later described nonlinear circuit 30. The modulated portion of the received signal, that is, the component signal having the frequency $f_0 \pm f_s$ is demodulated by the nonlinear circuit 30, which in turn sends forth a demodulated signal having the frequency $f_s$ to an inductor $L_2$. In this case, signal components having frequencies such as $2f_0 \pm f_s$, $2f_0 \pm 2f_s$, ... are also supplied through the diode $D_1$. However, the signal components are short-circuited by the capacitor $C_0$ and are not fed to the inductor $L_3$.

The nonlinear circuit 30 includes a matching circuit formed of a strip line $SL_1$ which acts as an open stub, a strip line $SL_2$, diode $D_1$ connected to the antenna 28 through the matching circuit, RF choke coil $L_1$ connected to the anode of the diode $D_1$ and capacitor $C_0$ connected to the cathode of the diode $D_1$ to short-circuit a microwave signal. The strip lines $SL_1$ and $SL_2$ constituting the matching circuit are so designed as to cause a microwave signal received through the antenna 28 to be conducted to the diode $D_1$ without being substantially attenuated. The diode $D_1$ is formed of, for example, a Schottky barrier diode or varactor diode.

A signal of the $f_s$ frequency transmitted to the inductor $L_2$ is further conducted through an inductor $L_3$ electromagnetically connected to the inductor $L_2$ and then supplied to a coding circuit or a resonance filter 32 formed by the parallel arrangement of a plurality of resonance circuits $C_1$ to $C_N$ each including, for example, a quartz oscillator of high quality factor Q and ceramic resonance element. Though the aforesaid frequency $f_s$ varies within the range of, for example, from 269 to 532 kHz, the resonance circuits $C_1$ to $C_N$ are so designed as to resonate at a frequency of from $f_1$ to $f_N$ previously specified within the range of the frequency $f_s$.

Now assume that a large number of, for example, freight trains represented by 4000 different identification codes are on the service line; a particular one among them is going to be identified by means of binary code; a resonance filter can contain twelve resonance circuits having twelve different resonance frequencies $f_1$ to $f_{12}$ to handle the aforesaid 4,000 different identification codes; and the resonance filter is so designed as to have a particular binary code for identifying any of the aforesaid 4,000 different identification codes of freight trains (hereinafter referred to as "an identification code") by selectively operating at least one of said twelve resonance circuits $C_1$ to $C_{12}$.

For briefness of description, let it be further assumed that the resonance filter 32 is fomed of two resonance circuits resonating at frequencies of $f_2$ and $f_4$ respectively. The output ringing signals having the $f_2$ and $f_4$ frequencies respectively which are sent forth from the resonance filter 32 are delivered to the nonlinear circuit 30 through the inductors $L_2$ and $L_3$. The nonlinear circuit 30 modulates a carrier wave having a frequency $f_0$ by signals having the frequencies $f_2$ and $f_4$, and produces an output signal having frequencies represented by $(f_0 \pm f_2)$ and $(f_0 \pm f_4)$. This output signal is transmitted to the interrogating device 1. It will be noted that the responding device 2 is not provided with a drive power source, but is operated upon receipt of a signal from the interrogating device 1.

A signal transmitted from the antenna 28 to the antenna 26 of the interrogating device 1 is supplied through the circulator 24 to one input terminal of the frequency mixer 34 included in the interrogating device 1. The frequency mixer 34 which is already supplied at the other input terminal with an output signal having the frequency $f_0$ from the divider 14 mixes the frequency $f_0$ signal with a signal having frequencies represented by $f_0 \pm f_2$ and $f_0 \pm f_4$, and issues an output signal having frequencies $f_2$ and $f_4$. This output signal from the frequency mixer 34 is transferred through a noise-eliminating band pass filter 36 to one input terminal of a frequency mixer 38, the other end of which is supplied with an output sweep signal from the sweep signal generator 10. The frequency mixer 38 mixes a frequency $f_s$ sweep signal supplied from the sweep signal generator 10 with a signal having frequencies $f_2$ and $f_4$ which is issued from the frequency mixer 34 through the band pass filter 36 and generates a ringing signal having frequencies represented by $f_s \pm f_2$ and $f_s \pm f_4$. This output ringing signal from the frequency mixer 38 is conducted to an identification code-detecting circuit 40, where a particular identification code already set in the resonance filter 32 is interpreted.

Figure 2:
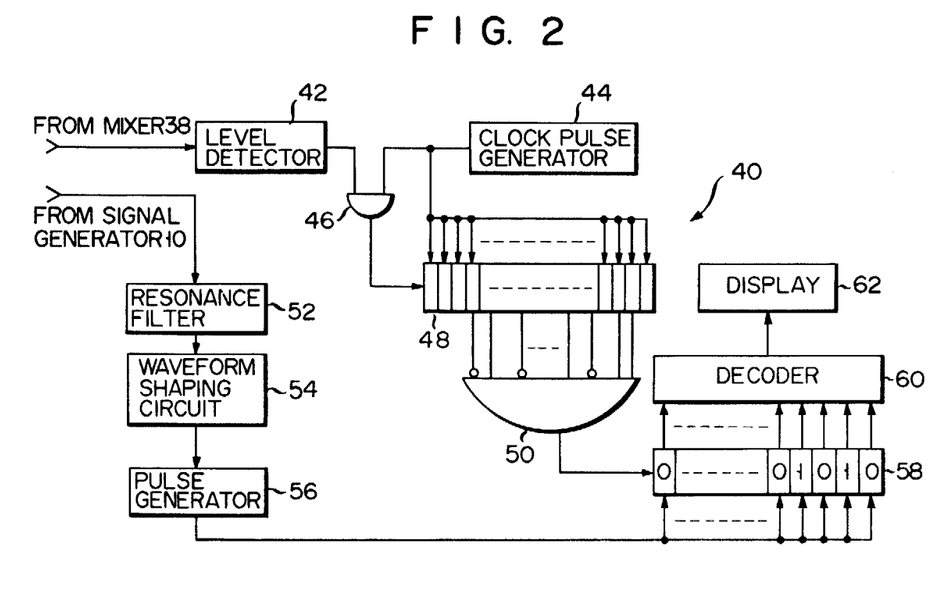
FIG. 2 is a block circuit diagram of an identification code detecting circuit used with the foreground subject-identifying apparatus of FIG. 1.
Figure 3A:
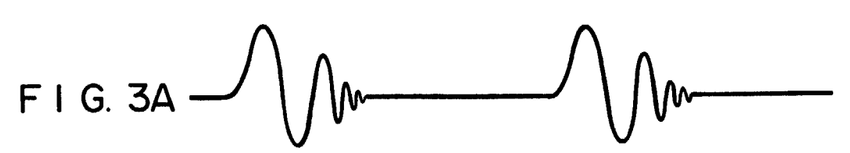
FIGS. 3A and 3E show waveforms of signals illustrating the operation of identification code detecting circuit of FIG. 2.
Figures 3B, 3C:
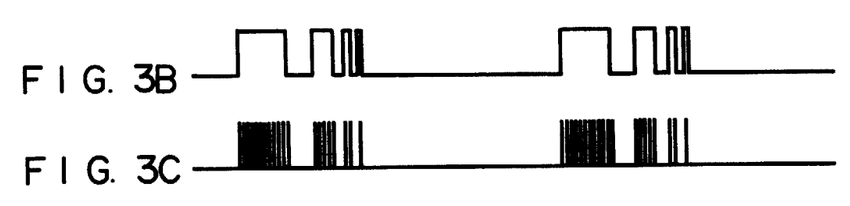
Figure 3D:
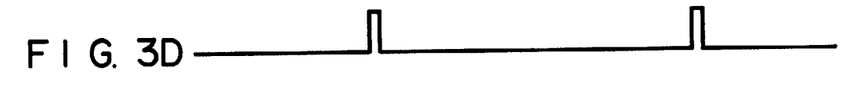

There will now be described by reference to FIG. 2 the arrangement and operation of the identification code-detecting circuit 40. When supplied with a ringing signal of FIG. 3A from the frequency mixer 38, a level detector 42 generates an output signal of FIG. 3B, which in turn is fed to an AND gate 46, one input terminal of which is supplied with a clock pulse from a clock pulse generator 44. An output signal of FIG. 3C from the AND gate 46 is carried to a multistage shift register circuit 48 formed of a large number of cascade-connected shift registers and operated by a clock pulse issued from the clock pulse generator 44. As the result, the respective shift registers included in the shift register circuit 48 hold an output signal from the level detector 42, namely, contents corresponding to the signal of FIG. 3B. Some specified shift registers included in the shift register circuit 48 are directly connected to an AND gate 50 and some other specified shift registers are each connected to the AND gate 50 through an inverter. The shift registers connected to the inverters, whether directly or indirectly, are experimentally designed to cause a clock pulse of FIG. 3D to be issued from the AND gate 50 when the shift registers hold contents corresponding to a ringing signal.

Figure 3E:
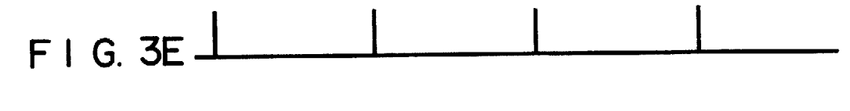

When supplied with a sweep signal from the sweep signal generator 10, a resonance filter 52 arranged like the resonance filter 32 of FIG. 1 and designed to allow the passage of signals having frequencies $f_1$ to $f_N$ produces an output signal, whose waveform is shaped into a pulse signal of FIG. 3E by a waveform shaping circuit 54. The pulse signal is issued from a pulse generator 56 and used as a clock pulse for operating a shift register circuit 58 formed of an N number of cascade connected shift registers. A signal delivered from the AND gate 50 is shifted in the shift register circuit 58 upon receipt of a clock pulse from the pulse generator 56.

Since, in the above-mentioned case, the resonance filter 32 is formed of resonance circuits resonating at frequencies $f_2$, $f_4$, the shift register circuit 58 is initially supplied with a signal having a logic level of "0" and then signals having logic levels of "1", "0", "1" and "0" in this order. When, therefore, an N number of clock pulses have all been issued from the puse generator 56, namely, upon lapse of 30 milliseconds, the shift register circuit 58 is supplied with data whose contents denote an identification code defined by particular resonance circuits included in the resonance filter 32. The contents of the shift register circuit 58 are decoded by a decoder 60. The decoded signal is indicated as an identification code by a display device 62.

Figures 4, 5, 7:
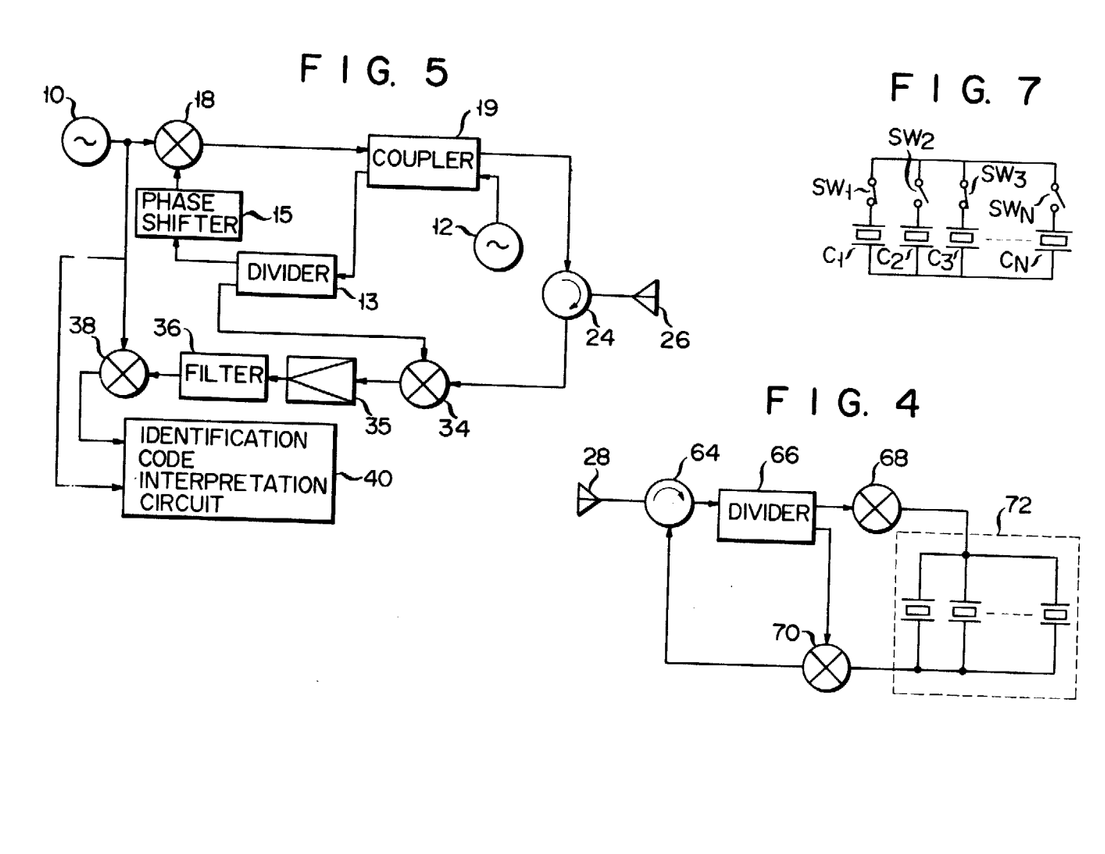
FIG. 4 indicates a modification of a responding device used with the foreground subject-identifying apparatus of FIG. 1.
FIG. 5 indicates a modification of an interrogator device used with the foreground subject-identifying apparatus of FIG. 1.
FIG. 7 sets forth a modification of a resonance filter used with the embodiments of FIGS. 1 and 5.

With the foregoing embodiment, the arrangement of the responding device 2 may be modified as shown in FIG. 4. Referring to FIG. 4, a composite signal having frequencies of $f_0$ and $f_0 \pm f_s$ which is introduced through the antenna 28 into the responding device 2 is conducted to a divider 66 through a circulator 64. An output signal from one of the output terminals of the divider 66 is supplied to a mixer 68, and an output signal from the other output terminal of the divider 66 is delivered to another mixer 70. Since the local signal terminal of the mixer 68 is left open, a composite signal having frequencies of $f_0$ and $f_0 \pm f_s$ which has been received at the input terminal of the mixer 68 is detected by a nonlinear element included in the mixer 68. As the result, the mixer 68 issues from its IF terminal a mixed signal having frequencies of not only $f_s$ but also $2f_0 \pm f_s$, $2f_0 \pm 2f_s$,... However, a resonance filter 72 supplied with an output composite signal from the mixer 68 is so designed as to be operated only upon receipt of a component signal having a frequency $f_s$. Therefore, it is unnecessary to consider the other component signals. Like the resonance filter 32 of FIG. 1, the resonance filter 72 of FIG. 4 includes resonance circuits resonating at frequencies of from $f_1$ to $f_N$, and sends forth a signal having frequencies $f_1$ to $f_N$. The mixer 70 modulates an output signal from the divider 66 by an output signal from the resonance filter 72 and produces a composite signal having frequencies represented by $f_0 \pm (f_1, \ldots, f_N)$ This composite signal is sent forth to the outside through the circulator 64 and antenna 68 in turn.

Further, the interrogating device 1 may be arranged as shown in FIG. 5. The interrogating device 1 of FIG. 5 is similar to that of FIG. 1 except that an output carrier wave from the carrier wave generator 12 is conducted to the first input terminal of the coupler 19 formed of, for example, a directional coupler; a signal to corresponding to the carrier wave is supplied from th first output terminal of the coupler 19 to a divider 13; an output signal from a frequency mixer 18 is sent forth to the second input terminal of the coupler 19; and a composite signal formed of output signals from the frequency mixer 18 and carrier wave generator 12 is carried from the second output terminal fo the coupler 19 to the circulator 24. An output signal from one of the output terminals of the divider 13 has its phase adjusted by a phase shifter 15 and then supplied to the frequency mixer 18. An output signal from the other output terminal of the divider 13 is delivered to the frequency mixer 12. The phase shifter 15 is intended to cause output signals from the carrier wave generator 12 and frequency mixer 18 to be supplied to the coupler 19 with exactly the same phase. An amplifier 35 provided between a frequency mixer 34 and a filter 36 amplifies an output signal from said frequency mixer 34 to elevate a signal-to-noise ratio.

Where, with the foreground subject-identifying apparatus of FIG. 1, a distance between the antennas of the interrogating device 1 and the responding device 2 indicates $n\lambda/4$ with $n$ taken to be an integer and $\lambda$ to denote the length of the electric wave applied (about 3 cm because a carrier wave having a frequency of 10.5 GHz is used in the embodiment of FIG. 1) according to a phase relationship between a composite signal having a frequency represented by $f_0 \pm (f_1, f_2 \ldots f_n)$ which is supplied from the responding device 2 to the interrogating device 1 and a carrier wave having a frequency $f_0$ which is to be mixed with the composite signal, then there arises the undesirable so-called "null point" phenomenon in which a signal detected by the interrogating device has its voltage level reduced to zero.

Figure 6:
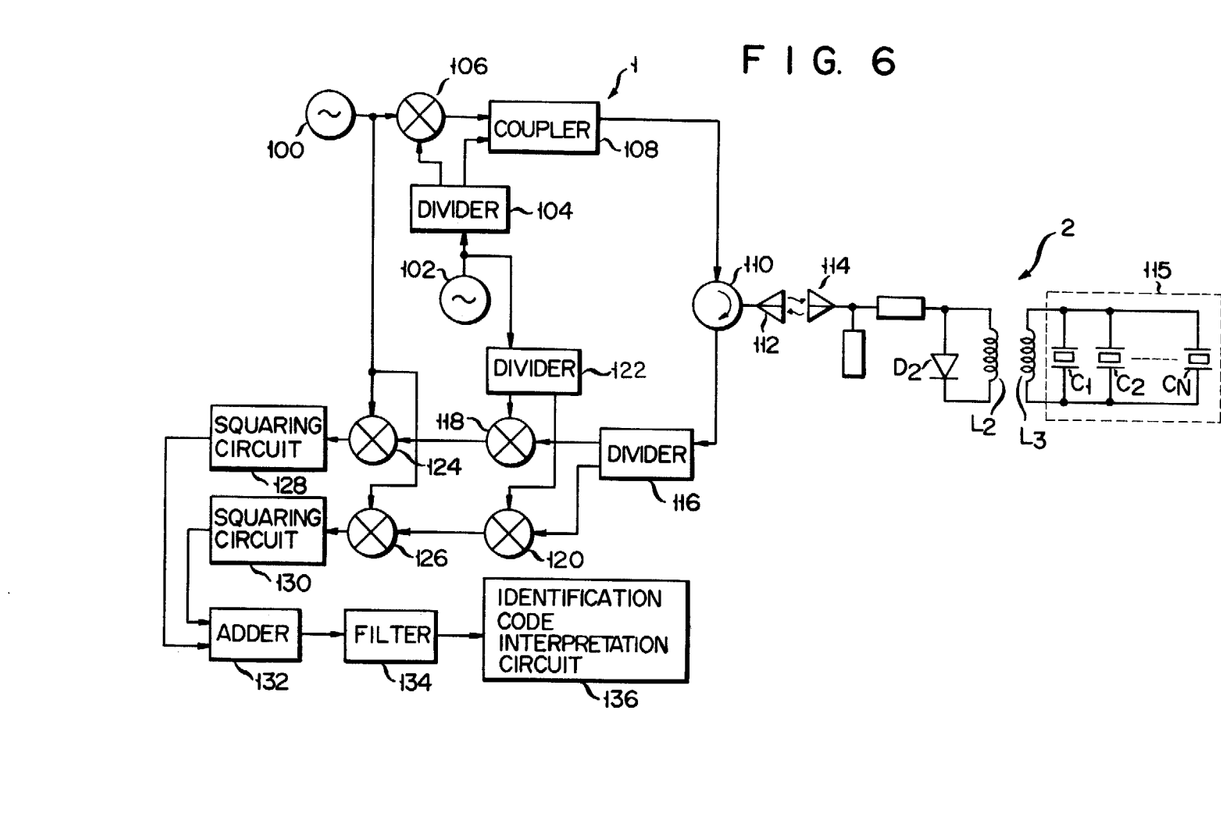
FIG. 6 is a schematic block circuit diagram of a foreground subject-identifying apparatus according to another embodiment of this invention.

FIG. 6 shows the arrangement of a foreground subject-identifying apparatus according to another embodiment of this invention which eliminates the occurrence of the above-mentioned "null point" phenomenon.

The foreground subject-identifying apparatus of FIG. 6 is provided with a sweep signal generator 100 and carrier wave generator 102 of the same type as those used with the interrogating device 1 of FIG. 1. An output signal having a frequency $f_0$ which is sent forth from the carrier wave generator 102 is divided into two portions by a divider 104. One divided portion is supplied to a frequency mixer 106 and the other divided portion is conducted to a coupler 108. The frequency mixer 106 mixes a sweep signal having a frequency $f_s$ which is already supplied thereto from the sweep signal generator 100 with a signal having a frequency $f_0$ which is delivered from the divider 104, and sends forth a signal having a frequency $f_0 \pm f_s$ to a coupler 108. This coupler 108 mixes together a signal having a frequency $f_0 \pm f_s$ which is supplied from the frequency mixer 106 and a signal having a frequency $f_0$ which is carried from the frequency divider 104. As the result, the coupler 108 transmits a composite signal having frequencies $f_0 \pm f_s$ and $f_0$ from an antenna 112 through a circulator 110 to an antenna 114 a signal thus supplied to the responding device 2 is detected by a diode $D_2$ to have frequency $f_s$, and then passes through electromagnetically connected coils $L_2$ and $L_3$ to a resonance filter 115 arranged like the resonance filter 32 of FIG. 1. When supplied with the signal having a frequency $f_s$ of, for example, 269 to 532 kHz, the resonance filter 115 issues a signal having resonance frequencies $f_1$ to $f_N$ ($269 < f_1, \ldots, f_N < 532$) defined by resonance circuits $C_1$ to $C_N$ included in the resonance filter 115. The output signal from the resonance filter 115 is mixed by the diode $D_2$ with a signal having a frequency. As the result, a composite signal having a frequency $f_0 \pm (f_1$ to $f_N)$ is emitted from the antenna 114 of the responding device 2.

The composite signal conducted from the antenna 114 to the antenna 112 of the interrogating device 1 is carried to a divider 116. An output signal from one of the output terminals of the divider 116 is transmitted to a frequency mixer 118, and an output signal from the other output terminal of the divider 116 is conducted to another frequency mixer 120. The mixers 118 and 120 are respectively connected at another input terminal to the divider 122 which divdes the output signal of the carrier wave generator 102 to produce two output signals with a frequency $f_0$ and a phase difference of 90°. Accordingly, the mixers 118 and 120 produce output signals having frequencies $f_1, \ldots, f_N$ and a phase difference of 90°. Output signals from the frequency mixers 118 and 120 are sent forth to the corresponding frequency mixers 124 and 126 which are each supplied with a sweep signal from the sweep signal generator 100. The frequency mixer 124 mixes together a sweep signal having a frequency $f_s$ which is supplied from the sweep generator 100 and a signal having a frequency $f_1$ to $f_N$ which is delivered from the frequency mixer 118. As the result, the frequency mixer 124 sends forth a composite signal having a frequency $f_s \pm (f_1$ to $f_N)$ to a squaring circuit 128. The frequency mixer 126 mixes together a sweep signal having a frequency $f_s$ which is sent forth from the sweep signal signal generator 100 and a signal having a frequency $f_1$ to $f_N$ which is brought from the frequency mixer 120. As the result, the frequency mixer 126 transmits a composite signal having a frequency $f_s \pm (f_1$ to $f_N)$ to another squaring circuit 130. The squaring circuits 128, 130 square output signals from the frequency mixers 124 and 126. The signals thus squared are supplied to an adder 132 to be added together. After stripped of noises by a filter 134, the added squared signals are processed by an identification code-detecting circuit 136 of the same type as that of FIG. 1, thereby interpreting a particular identification code defined by the resonance filter 116.

There will now be described the process by which the "null point" phenomenon can be eliminated in the foreground subject identifying apparatus of FIG. 5. For briefness of description, assume that a signal supplied from the antenna 112 through the circulator 110 and divider 116 to the frequency mixers 118 and 120 has a frequency $f_0 \pm f_N$, and an initial phase $\theta$, and is expressed as $\cos\{2\pi(f_0 \pm f_N)t + \theta\}$; and signals delivered from the divider 122 to the frequency mixers 118 and 120 have a frequency $f_0$ and an initial phase $\phi$ alike, and are expressed as $\cos(2\pi f_0 t + \phi)$ and $\sin(2\pi f_0 t + \phi)$ respectively. Then the frequency mixers 118 and 120 produce ringing signals demodulated in the form of $\cos(\theta - \phi) \cdot \cos 2\pi f_N t$ and $\sin(\theta - \phi) \cdot \cos 2\pi f_N t$. These ringing signals are mixed in the frequency mixers 124 and 126 with a signal having a frequency $f_s$ which is delivered from the sweep signal generator 100.

As the result, ringing responding signals expressed as $\cos(\theta - \phi) \cdot \cos 2\pi(f_s - f_N)t$ and $\sin(\theta - \phi) \cdot \cos 2\pi(f_s - f_N)t$ are transmitted from the frequency mixers 124 and 126. These ringing responding signals are squared by the corresponding squaring circuits 128 and 130 and added together in the adder 132, which in turn issues a composite signal expressed as follows:

$$\cos^2(\theta-\phi)\cdot\cos^2 2\pi(f_s-f_N)t + \sin^2(\theta-\phi)\cdot\cos^2 2\pi(f_s-f_N)t = \cos^2 2\pi(f_s-f_N)t$$

Namely, the signal expressed as $\cos^2 2\pi(f_s-f_N)t$ is obtained regardless of a phase difference between a responding signal having a frequency $f_0 \pm f_N$ which is issued from the antenna 114 of the responding device 115 and a carrier wave having a frequency $f_0$, thereby suppressing the occurrence of the "null point" phenomenon. The above-mentioned signal $\cos^2 2\pi(f_s-f_N)t$ is processed by a filter 134. Thereafter, the resultant signal $\cos 4\pi(f_s-f_N)t$ is conducted to an identification code-detecting circuit 136 to interpret, the subject identification code.

With the foregoing embodiment, power requirement for a responding signal to be transmitted from the responding device 2 to the interrogating device 1 is mainly determined by power required for an output signal to be issued from the interrogating device 1 (effective power emitted from the antennas 26 and 112), a distance between the interrogating device 1 and responding device 2 and the efficiency with which the responding device 2 carries out modulation and demodulation. Where, with transmission power taken to be 10 W, a total of gains in the antennas 26 and 28 or in the antennas 112 and 114 is 40 decibels, then a fully powerful signal is received by the interrogating device 1, even when the responding device 2 is spaced about 10 meters from the interrogating device 1.

This invention is not limited to the above-mentioned embodiments, but may be practised in many other modifications.

The foregoing description refers to the case when the resonance filter was formed of one resonance circuit or a plurality of parallel arranged resonance circuits having different resonance frequencies. However, it is possible for the object of this invention to connect in parallel, as shown in FIG. 7, series circuits formed of resonance circuits $C_1$ to $C_N$ and the corresponding switching elements $SW_1$ to $SW_N$. Where, for example, 4000 freight trains are represented by different identification codes, a resonance filter each including twelve resonance circuits is mounted on each of the 4000 freight trains. In this case, an identification code for a particular one of the freight trains is formed by selectively closing the switching elements of the twelve resonance circuits.

What we claim is:

1. A foreground subject-identifying apparatus which comprises a first signal-generating means for producing a first signal having a plurality of frequencies falling within a prescribed range; second signal-generating means for sending forth a second signal having a higher frequency than the first signal; first frequency mixing means for mixing output signals from the first and second signal-generating means and modulating the second signal by the first signal to produce a modulated signal; first transmission and reception means for transmitting an output signal from the first frequency mixing means; second transmission and reception means for receiving a signal sent forth from the first transmission and reception means; coding means provided with at least one resonance circuit to generate a coded signal corresponding to the frequency of said resonance circuit; a nonlinear circuit provided with a nonlinear element, coupled between the second transmission and reception means and coding means, and adapted to detect a signal issued from the second transmission and reception means to supply the coding means with a signal corresponding to the first signal, and modulate a signal corresponding to the second signal by a coded signal from the coding means to deliver a modulated signal to the second transmission and reception means; second frequency-mixing means for mixing an output signal from the second signal-generating means with a signal emitted from the second transmission and reception means and received through the first transmission and reception means; a third frequency-mixing means for mixing a first signal produced from the first signal generating means and an output signal from the second frequency-mixing means, thereby generating a signal corresponding to the coded signal; and a coded signal-interpreting circuit for judging the coded signal from an output signal of the third frequency-mixing means.

2. A foreground subject-identifying apparatus according to claim 1, wherein the first signal-generating means is sweep signal generator for supplying the first frequency mixing means with a sweep signal whose frequency continuously varies with the prescribed range and the second signal-generating means is a carrier wave generator for producing a carrier wave.

3. A foreground subject-identifying apparatus according to claim 2, which further comprises coupling means connected to receive an output signal from the first frequency-mixing means at a first input terminal and dividing means for dividing an output signal from the carrier wave generator into two portions, supplying one divided portion of said output signal to the first frequency-mixing means and conducting the other divided portion to a second output terminal of the coupling means.

4. A foreground subject-identifying apparatus according to claim 1, which comprises coupling means connected to receive an output signal from the first frequency-mixing means at a first input terminal and dividing means for dividing an output signal from the second signal-generating means into two portions, supplying one divided portion of said output signal to the first frequency-mixing means and delivering the other divided portion to a second input terminal of the coupling means, and wherein the first transmission and reception means includes an antenna and a circulator connected to receive an output signal from the coupling means at a first terminal, send forth a signal from a second terminal to the antenna and conduct a signal received at the second terminal through the antenna to the second frequency-mixing means from a third terminal.

5. A foreground subject-identifying apparatus according to claim 1, which further comprises a filter connected between the second and third frequency mixing means to remove the noise components of an output signal from the second frequency-mixing means.

6. A foreground subject-identifying apparatus according to claim 1, wherein the nonlinear circuit comprises an impedance matching circuit; a diode connected between the matching circuit and coding means; an inductor, one end of which is connected between the diode and matching circuit, and the other end of which is connected to the referential point of the nonlinear circuit; and a capacitor, one end of which is connected between the diode and coding means, and the other end of which is connected to said referential point of the nonlinear circuit.

7. A foreground subject-identifying apparatus according to claim 1, wherein said second transmission and reception means includes an antenna and a circulator adapted to receive a signal transmitted from the antenna at a first terminal, send forth said signal from a second terminal and issue a signal received at a third terminal from the first terminal; and said nonlinear circuit includes a dividing circuit for dividing a signal delivered from the second terminal of the circulator into two portions, fourth frequency-mixing means disposed between a first output terminal of the dividing circuit and coding means, and fifth frequency-mixing means for mixing an output signal from a second output terminal of the dividing circuit with an output signal from the coding means and supplying a resultant mixed signal to the third terminal of the circulator to transmit the resultant mixed signal through the antenna.

8. A foreground subject-identifying apparatus according to claim 1, wherein the nonlinear circuit is formed of a diode, one end of which is connected to the second transmission and reception means and the other end of which is connected to the referential point of the nonlinear circuit and said nonlinear circuit and coding means are coupled by a pair of inductors which are electromagnetically coupled with each other, one of said pair of inductors being connected in parallel with said nonlinear circuit and the other one of said pair of inductors being connected in parallel with said coding means.

9. A foreground subject-identifying apparatus according to claim 8, wherein the nonlinear circuit further comprises an impedance matching circuit disposed between the second transmission and reception means and the diode.

10. A foreground subject-identifying apparatus according to claim 1, which further comprises a coupler connected to receive a second signal from the second signal-generating means at a first input terminal and a modulated signal supplied from the first frequency mixing means at a second input terminal, and sending forth a signal corresponding to the first signal from a first output terminal and a composite signal formed of the first signal and modulated signal from a second output terminal; a divider for dividing an output signal from the first output terminal of the coupler into two portions and delivering an output signal from a first output terminal to the second frequency mixing means; and a phase shifter for adjusting the phase of a signal issued from the second output terminal of the divider and conducting a phase-shifted signal to the first frequency mixing means.

11. A foreground subject-identifying apparatus according to claim 10, which further comprises an amplifier for amplifying an output signal from the second frequency mixing means.

12. A foreground subject-identifying apparatus according to claim 10, wherein the coupler is a directional coupler.

13. A foreground subject-identifying apparatus which comprises a first signal-generating means for producing a first signal having a plurality of frequencies falling within a prescribed range; second signal-generating means for sending forth a second signal having a higher frequency than the first signal; first frequency mixing means for mixing output signals from the first and second signal-generating means and modulating the second signal by the first signal to produce a modulated signal; first transmission and reception means for transmitting an output signal from the first frequency mixing means; second transmission and reception means for receiving a signal sent forth from the first transmission and reception means; coding means provided with at least one resonance circuit to generate a coded signal corresponding to the frequency of said resonance circuit; a nonlinear circuit provided with a nonlinear element, coupled between the second transmission and reception means and coding means, and adapted to detect a signal issued from the second transmission and reception means to supply the coding means with a signal corresponding to the first signal, and modulate a signal corresponding to the second signal by a coded signal from the coding means to deliver a modulated signal to the second transmission and reception means; first dividing means for dividing a signal received through the first transmission and reception means into two portions; second dividing means for dividing an output signal from the second signal generating means into two portions having a phase difference of $(n+\frac{1}{2})\pi$ ($n$ is a positive integer); second frequency mixing means having first and second frequency mixers connected to receive at one input terminal respective output signals of the first dividing means and to receive at the other input terminal respective output signals of the second dividing means, thereby respectively producing output signals corresponding to the frequency of an output signal from the coded means; third frequency- mixing means having third and fourth frequency mixers connected to receive at one input terminal respective output signals from the first and second frequency mixers and to receive an output signal from the first signal generating means at the other input terminal first and second squaring means for squaring output signals from the third and fourth frequency mixers, respectively; an adder for adding together output signals from the first and second squaring means to generate a signal corresponding to the coded signal; and a coded signal-interpretting circuit for judging the coded signal from an output signal of the second frequency mixing means.

* * * * *